United States Patent

[11] 3,590,513

| [72] | Inventor | Robert N. Lund<br>6006 Darramoor Road, Birmingham, Mich. 48010 |
|---|---|---|
| [21] | Appl. No. | 754,390 |
| [22] | Filed | Aug. 21, 1968 |
| [45] | Patented | July 6, 1971 |

[54] FISH LURE
2 Claims, 17 Drawing Figs.

[52] U.S. Cl. ................................................ 43/42.06, 43/42.5
[51] Int. Cl. ................................................ A01k 85/00
[50] Field of Search ........................................ 43/42.06, 42.5

[56] References Cited
UNITED STATES PATENTS

| 2,777,243 | 1/1957 | Pope | 43/42.5 |
| 2,895,252 | 7/1959 | Tibbetts | 43/42.5 |
| 923,670 | 6/1909 | Lockhart | 43/42.06 |
| 1,099,606 | 6/1914 | Larrabee | 43/42.06 |
| 1,609,855 | 12/1926 | Bayer | 43/42.06 |
| 2,680,320 | 6/1954 | Rothbard | 43/42.06 |
| 2,865,129 | 12/1958 | Spugios | 43/42.06 |
| 2,871,609 | 2/1959 | Noches | 43/42.06 |

FOREIGN PATENTS

| 258,024 | 11/1967 | Austria | 43/42.06 |

*Primary Examiner*—Samuel Koren
*Assistant Examiner*—Daniel J. Lench
*Attorney*—Harness, Dickey & Pierce

ABSTRACT: A fish lure constructed as a spoon-type lure of upwardly presenting dish shape having a pair of longitudinally spaced transverse openings therein. The water through which the lure is drawn will pass through the openings to produce side-to-side oscillating movement as well as an up-and-down movement to the lure.

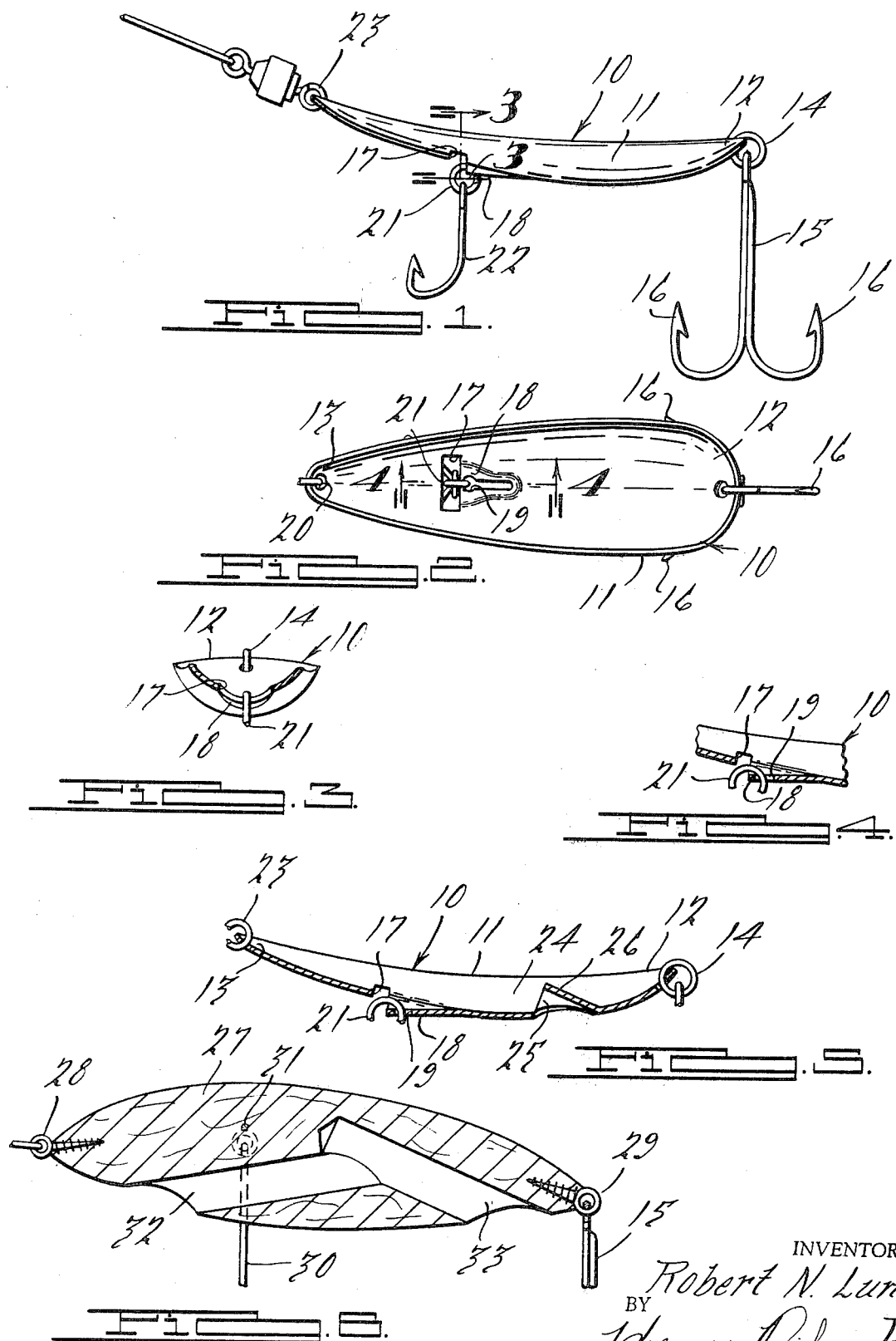

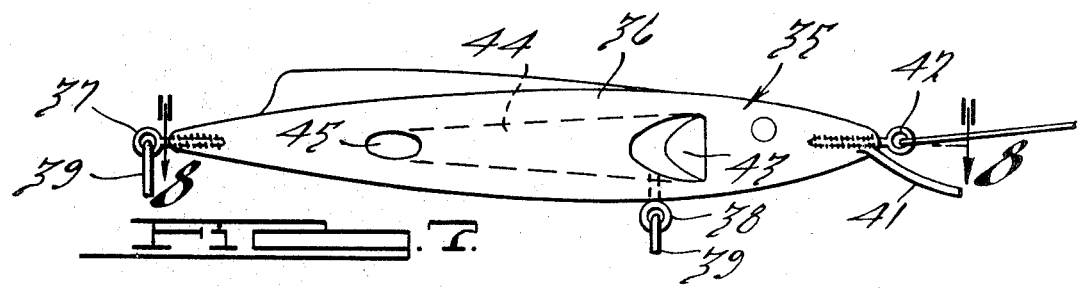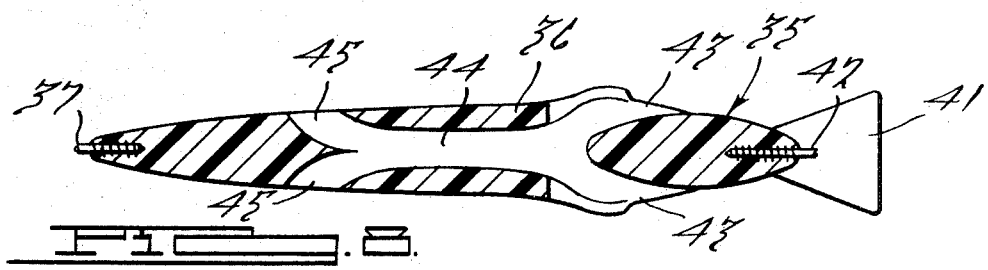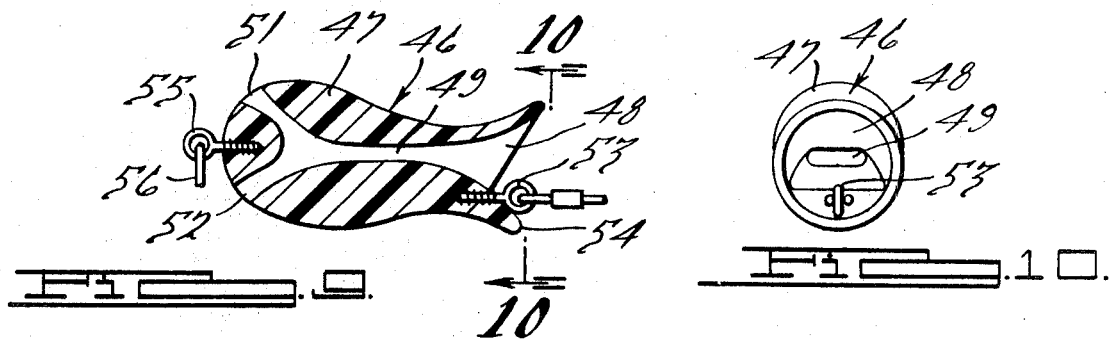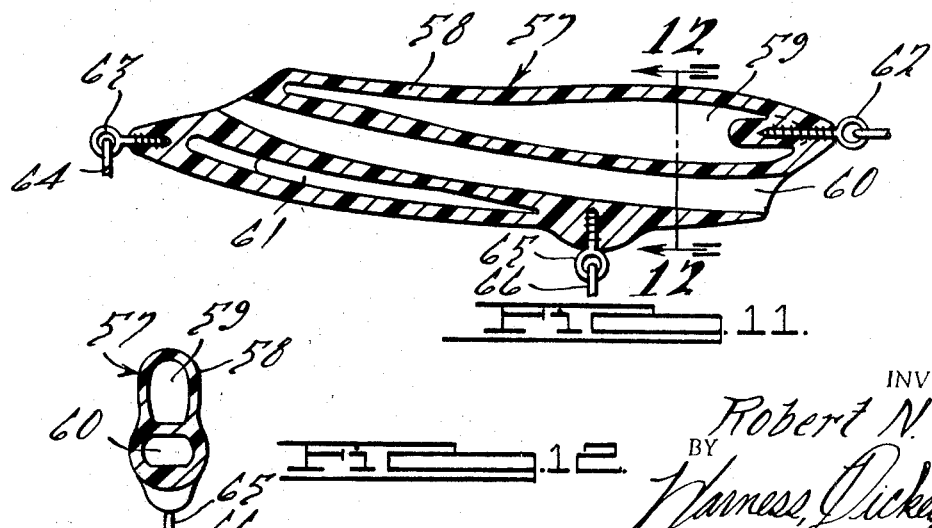

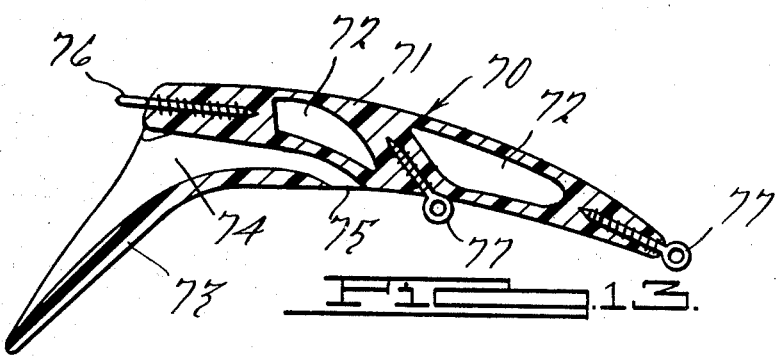
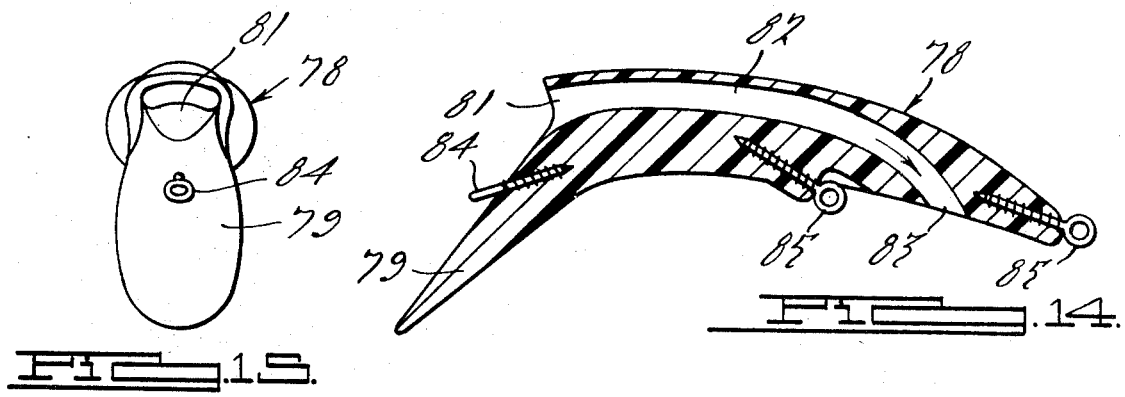
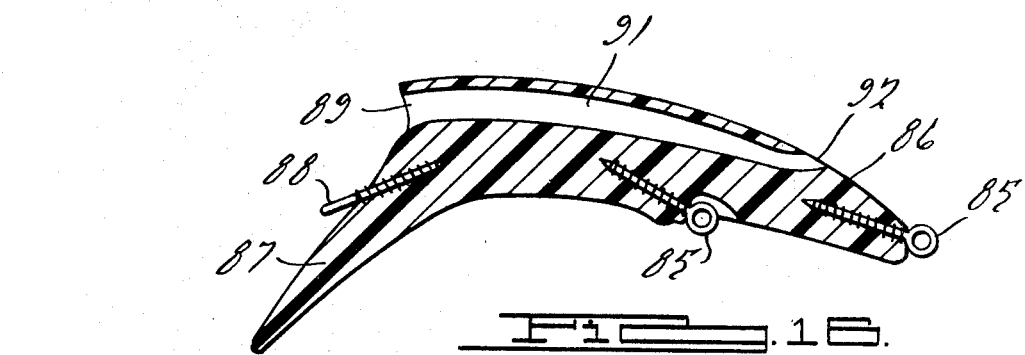
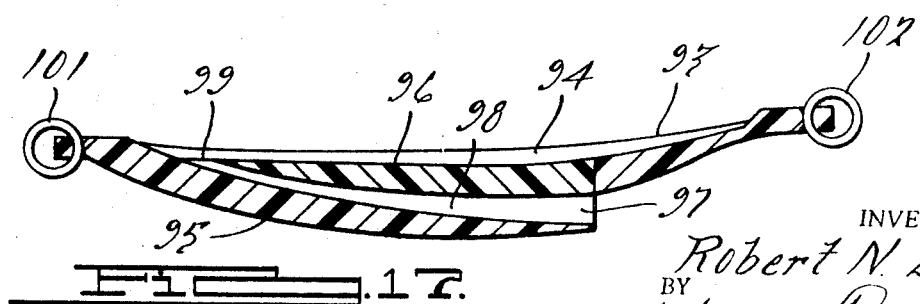

FISH LURE

SUMMARY OF THE INVENTION

The invention pertains to a fish lure having different-type bodies so constructed as to have the water through which the fish lure is drawn flow through the body from the front toward the rear end thereof. The bodies may be made of metal, wood or plastic material and when made of plastic material are preferably made in halves and adhered together to provide a clear passageway and in some instances a sealed chamber for buoyancy. The movement of the water through the passageway produces an upward, sideward and in some cases a downward movement to the rear end of the bait which controls the depth at which the lure will advance when drawn through the water at different speeds. The front end of the passageway may be of scooped shape forming a lip extending downward to form a diving vane. In some instances, the passageway is reduced in area toward the rear so as to increase the velocity of the water passing therethrough to produce a jet effect and turbulence at the end of the passageway. This construction provides motion and control of the lure body, the flow of water producing a sidewise movement and a rocking action as well as an up-and-down movement and in some instances an oscillating movement between the front and rear ends of the body.

BRIEF DESCRIPTION OF THE DRAWINGS

FIG. 1 is a view in elevation of a lure in the nature of a spoon having an opening through the body embodying features of the present invention;

FIG. 2 is a plan view of the structure illustrated in FIG. 1;

FIG. 3 is a sectional view of the structure illustrated in FIG. 1, taken on the line 3-3 thereof;

FIG. 4 is a broken sectional view of the structure illustrated in FIG. 2, taken on the line 4-4 thereof;

FIG. 5 is a sectional view of structure, similar to that illustrated in FIG. 1, showing a further form of the invention;

FIG. 6 is a view of structure, similar to that illustrated in FIG. 5, showing a still further form which the invention may assume;

FIG. 7 is a view in elevation of a fish lure, showing another form thereof;

FIG. 8 is a sectional view of the structure illustrated in FIG. 7, taken on the line 8-8 thereof;

FIG. 9 is a sectional view of a lure similar to that of FIG 8, showing a still further form of the invention;

FIG. 10 is a sectional view of the structure illustrated in FIG. 9, taken on the line 10-10 thereof;

FIG. 11 is a sectional view of a fish lure, similar to that illustrated in FIG. 8, showing another form of the invention;

FIG. 12 is a sectional view of the structure illustrated in FIG. 11, taken on the line 12-12 thereof;

FIG. 13 is a sectional view of structure, similar to that illustrated in FIG. 11, showing another form of the invention;

FIG. 14 is a view of structure, similar to that of FIG. 13, showing a further form of the invention;

FIG. 15 is a front end view of the structure illustrated in FIG. 14;

FIG. 16 is a view of structure, similar to that illustrated in FIG. 14, showing another form of passageway therethrough, and FIG. 17 is a view of structure similar to that illustrated in FIG 1, showing a further form of the invention.

DESCRIPTION OF THE PREFERRED EMBODIMENTS

A spoon 10 is illustrated in FIGS. 1 to 4 of conventional form having a dish-shaped body 11 that is wider at the rear end 12 than at the front end 13. A ring 14 in an aperture in the rear end 12 carries a gang hook 15 which may have two or more bars 16 thereon. A slot 17 is provided through the forward portion of the body and the metal therebehind is deflected downwardly at 18 to form a scoop for the entrance of the water as the lure is pulled forwardly therethrough. The passage of water through the scoop portion operates on the inner dished surface and on the opposite sides of the body 11 as it swings on the line to cause a tilting of the body about its longitudinal axis and to oscillate thereto sidewardly thereof. An aperture 19 in the deflected portion 18 has a ring 21 secured therein for supporting a hook 22 which may be of a single or gang type and which is preferably smaller than the hooks 15 at the rear end of the body. A ring 23 is secured in an aperture 20 at the front end 13 of the body to which a line is attached. When the spoon is employed a weight is provided ahead of the line to control the depth at which the lure operates.

Since a weight is used to control the depth of the lure illustrated in FIGS. 1 to 4 when pulled through the water, in FIG. 5 a further form of lure is illustrated that reduces the weight requirement. A body 24 of a spoon-type lure made in accordance with the teachings of FIGS. 1 to 4, has a further opening 25 therein produced by a deflective portion 26 that extends within the dished portion of the body. As the water passes through the aperture 17, it strikes the deflected portion 26 and produces an upward force thereon as the water passes out through the opening 25. This tends to raise the rear end 12 of the body and thereby deflect the front end 13 downwardly to control the depth at which the spoon will operate and provide an up-and-down movement thereto while attempting to change its depth which movement is in addition to the tilting and oscillating movements above described.

In FIG. 6, a still further form of passageways is illustrated through a body 27 of a lure of the plug type. The body 27 of the lure is made of wood, plastic or other material of tapered oval shape. The body has an eye 28 at the front for a line and an eye 29 at the rear end for a set of gang hooks 15. A cross rod 31 has a hook 30 at each end to locate the hooks at the side of the body. An aperture 32 at the front end slopes upwardly into the body and communicates with a downwardly sloping aperture 33 at the rear end of the body. The aperture 32 produces a flow of water into the aperture 33 which is expelled downwardly producing an upward force on the rear of the body which causes the front end of the body to be urged downwardly. This controls depth and adds an up-and-down movement to a tilting movement of the body about the longitudinal axis and sidewise oscillation relative thereto. By employing the apertures 32 and 33 the planing nose usually employed on a body 27 to control depth is eliminated.

Referring to FIGS. 7 and 8, a further form of fish lure 35 is illustrated having an elongated body 36 provided with an eye 37 at the rear and an eye 38 extending downward near the forward end for hooks 39. The front end of the body has a diving vane 41 extending downwardly therefrom and an eye 42 for a line by which the body is drawn forwardly through the water. Adjacent to the forward end oppositely passageway side inlets 43 extend rearwardly to a central passage 44 which has outlet openings 45 at the sides near the rear end of the body. As the body is drawn through the water, the water will enter the inlet openings 43, pass through the central passageway 44 and out through the outlet openings 45. This produces a turbulence within the body which causes gyrations thereto in all directions.

In FIGS. 9 and 10, a further form of the lure 46 is illustrated having a body 47 provided with a wide funnellike opening 48 at the front end which is connected by a central passageway 49 to outlet openings 51 and 52 at the top and bottom of the body respectively. This produces the up-and-down agitation to the body 47 as the fish lure is drawn forwardly by a line secured to an eye 53 on a lip 54 at the front end which functions as a diving vane. An eye 55 at the rear end supports a set of hooks 56.

A fish lure 57, illustrated in FIGS. 11 and 12 is preferably made from plastic in two halves bonded together along the center plane. A body 58 has a chamber 59 at the top and a chamber 61 at the bottom above and below a through passageway 60 for producing buoyancy to the body. The through passageway 60 decreases in area from the front to the rear and increases the velocity of the water passing therethrough which produces a jet effect to the discharged water which produces turbulence and an up-and-down movement at the rear end to attract fish. An eye 62 is provided at the forward end for a line and an eye 63 located at the rear end supports a set of hooks 64. An eye 65 on the bottom of the body supports a set of hooks 66. It is to be understood that the body 36, illustrated in FIGS. 7 and 8 and the body 47 of FIGS. 9 and 10, likewise could be made from two plastic molded parts bonded together along the central plane. The bodies may be of different colors or a varigation of colors for attracting different fish in different environments.

In FIG. 13, a lure 70 is illustrated having a plastic body 71 which is made in two halves and adhered together on the center thereof. The body is so constructed as to have sealed chambers 72 in the upper part thereof to provide buoyancy to the body and to reduce the weight thereof. The forward end of the body is extended downwardly to form a lip 73 which functions as a diving vane and also as a scoop for the water which passes into a passageway 74. The passageway is reduced in area to an outlet end 75 at the underside of the body midway between the front and rear ends thereof. The reduced area of the passageway 74 increases the velocity of the discharged water which produces substantial turbulence at the outlet end 75. This produces an up-and-down movement to the body in addition to the turbulence and provides an additional attraction for the fish with that of the oscillating movement of the body. The forward end of the body has an eye 76 for a line and the rear end has eyes 77 for the gang hooks. It is to be understood that the plastic material may be of varied colors or a varigation of colors to add attraction to the body.

In FIGS. 14 and 15, s similar body 78 is illustrated having a diving vane 79 at the front above which an entrance 81 is provided to a passageway 82 which is reduced in area as it bends downwardly at the rear to an outlet end 83. This passageway also increases the velocity of the water to provide turbulence and a force for raising the rear end of the lure body to give vigorous up-and-down movement thereto and to permit the bait to seek a lower depth when drawn through the water with the line attached to an eye 84 in the diving vane. Additional eyes 85 are provided near the rear end of the body for gang hooks which will extend downwardly therefrom. The body 78 preferably is made from plastic material and may be made in any one or a varigation of colors.

In FIG. 16, a body 86 of a fish lure is illustrated which is similar to the lure body of FIGS. 14 and 15 having a downwardly extending diving vane 87 at the forward end containing an eye 88 for the line by which the body is pulled through the water. Above the vane an opening 89 is provided to a passageway 91 which is reduced in area to an outlet opening 92 which, in this instance, is at the top of the body 86. This produces a turbulence at the top rear end of the body 86 and a downward force to the rear end of the body which produces an up-and-down movement as well as a force for decreasing the depth to which the diving vane 87 carries the body when pulled by a line at the different speeds. The eyes 85 are provided on the body in the same manner as that of FIG. 14 for the gang hooks which will hang downwardly therefrom.

In FIG. 17, a spoon type of lure 93 is illustrated having a dish-shaped upper surface 94 and an arcuate bottom surface 95. An insert 96 extends over a longitudinal slot in the center of the body with the upper portion thereof containing the dish-shaped form 94 at the top of the body. The insert is so constructed as to form an opening 97 at the bottom forward end of the body to a passageway 98 which reduces in area to an outlet end 99 to provide turbulence to the ejected water and a downward force at the rear end thereof. A ring 101 at the rear end is provided for a set of gang hooks while a ring 102 provides an attaching means for the line by which the spoon-type body is pulled through the water. Additional rings may be provided near the center of the body for additional hooks if this is desired. In any of the bodies illustrated in FIGS. 11 to 17, the increase of velocity in the water provides a turbulence which attracts the fish and produces a forward, downward or upward jet effect at the discharge end of the passageway. This provides movement to the body superimposed upon rolling sideward movement, vertical and horizontal oscillating movement and a force which adds to the control of the depth of the body relative to the speed by which it is pulled through the water.

In all of the fish lures herein illustrated, the novelty resides in the motion given to the lure by the passage of water from the front end through the body thereof. This produces a sidewise rocking along the center plane as well as an up and down movement to the body in greater or lesser degrees along with the turbulence of the water for the various lure bodies which are shown in the different figures.

I claim:

1. In a fish lure, a body of upwardly presenting dish shape and of substantial length having a narrow front portion and a wider rear portion, said body having apertures at the forward and rearward ends for a line and for a set of hooks respectively, said narrow front portion of the body having a passageway formed by a transverse cut through the body with a portion of the body rearwardly of the cut deflected downwardly to form a scoop for the admission of water, the said downwardly deflected portion having an aperture, ring means in said aperture, and hook means supported by said ring means for swinging movement below the upwardly presenting dish-shaped body.

2. In a fish lure as recited in claim 1, wherein a second transverse cut is provided in the rear wider portion of the body the rear end section of which is deflected upwardly into the body to form a scoop located within the dish-shaped portion and forming an aperture for the passage of the water from the first deflected portion downwardly below the rear end of the body which urges the rear end upwardly.